(12) United States Patent
Rich, Jr. et al.

(10) Patent No.: US 9,253,124 B2
(45) Date of Patent: Feb. 2, 2016

(54) TECHNIQUES FOR SENDING AND RELAYING INFORMATION OVER BROADCAST AND NON-BROADCAST COMMUNICATIONS MEDIA

(71) Applicant: TV Band Service, LLC, Wilmington, NC (US)

(72) Inventors: Donald C Rich, Jr., Wrightsville Beach, NC (US); Paul Allan Sadowski, Apex, NC (US); Keith W Bolick, Wilmington, NC (US)

(73) Assignee: TV Band Service, LLC, Wilmington, NC (US)

( * ) Notice: Subject to any disclaimer, the term of this patent is extended or adjusted under 35 U.S.C. 154(b) by 255 days.

(21) Appl. No.: 13/892,344

(22) Filed: May 13, 2013

(65) Prior Publication Data

US 2013/0308652 A1 Nov. 21, 2013

Related U.S. Application Data

(60) Provisional application No. 61/646,960, filed on May 15, 2012.

(51) Int. Cl.
*H04L 12/54* (2013.01)
*H04L 12/861* (2013.01)
(Continued)

(52) U.S. Cl.
CPC ............ *H04L 49/90* (2013.01); *H04L 67/2852* (2013.01); *H04N 21/4113* (2013.01); *H04N 21/4122* (2013.01); *H04N 21/4126* (2013.01);
(Continued)

(58) Field of Classification Search
USPC ........... 370/312–389, 401–428; 709/217–227
See application file for complete search history.

(56) References Cited

U.S. PATENT DOCUMENTS 5,790,541 A * 8/1998 Patrick et al. ................. 370/392
6,434,622 B1 * 8/2002 Monteiro et al. ............. 709/231
(Continued)

FOREIGN PATENT DOCUMENTS

KR 1020110066176 6/2011
WO 2011104115 9/2011

OTHER PUBLICATIONS

Groticelli, M.; "The challenges of datacasting"; BroadcastEngineering; Jun. 1, 2005; all pages.
(Continued)

*Primary Examiner* — Man Phan
(74) *Attorney, Agent, or Firm* — North Shore Patents, P.C.; Michele Liu Baillie

(57) ABSTRACT

Sending and relaying of information includes: a direct receiver receives messages from a server over a broadcast communications medium, each message having associated targeter data attributes; the direct receiver selects messages from the server for storage in a message store of the first receiver device based on the targeter data attributes associated with each message from the server; the direct receiver connects with an indirect receiver over the non-broadcast communications medium; the direct receiver receives a message request from the indirect receiver for messages in the message store of the direct receiver over a non-broadcast communications medium; and in response to the message request, the direct receiver sends messages in the message store of the direct receiver to the indirect receiver over the non-broadcast communications medium. The direct receiver receives data from the server, and the indirect receiver receives data via another receiver.

7 Claims, 12 Drawing Sheets

(51) Int. Cl.
  H04L 29/08    (2006.01)
  H04N 21/41    (2011.01)
  H04N 21/433   (2011.01)
  H04N 21/436   (2011.01)
  H04N 21/81    (2011.01)

(52) U.S. Cl.
  CPC ........... *H04N 21/433* (2013.01); *H04N 21/436* (2013.01); *H04N 21/8166* (2013.01)

(56) References Cited

U.S. PATENT DOCUMENTS

| | | | |
|---|---|---|---|
| 6,807,564 | B1 | 10/2004 | Zellner et al. |
| 6,847,395 | B2 | 1/2005 | Thomas et al. |
| 6,871,236 | B2 | 3/2005 | Fishman et al. |
| 6,950,124 | B2 | 9/2005 | Corl et al. |
| 7,215,360 | B2 | 5/2007 | Gupta |
| 7,263,666 | B2 | 8/2007 | Corl et al. |
| 7,305,696 | B2 | 12/2007 | Thomas et al. |
| 7,519,720 | B2 | 4/2009 | Fishman et al. |
| 7,565,506 | B2 | 7/2009 | Chen et al. |
| 7,586,912 | B2 * | 9/2009 | Agarwal et al. ............... 370/389 |
| 7,617,287 | B2 | 11/2009 | Vella et al. |
| 7,783,316 | B1 | 8/2010 | Mitchell |
| 7,996,482 | B1 * | 8/2011 | Evans et al. ................... 709/212 |
| 8,130,757 | B2 * | 3/2012 | Shimizu et al. ............... 370/390 |
| 2001/0013069 | A1 | 8/2001 | Shah |
| 2002/0129354 | A1 | 9/2002 | Bryan et al. |
| 2004/0153511 | A1 | 8/2004 | Maynard et al. |
| 2005/0008004 | A1 | 1/2005 | Williams |
| 2005/0086685 | A1 | 4/2005 | Rahman et al. |
| 2005/0271049 | A1 * | 12/2005 | Jain et al. ...................... 370/389 |
| 2006/0010215 | A1 | 1/2006 | Clegg et al. |
| 2007/0004377 | A1 | 1/2007 | Medford et al. |
| 2007/0136743 | A1 | 6/2007 | Hasek et al. |
| 2007/0216572 | A1 | 9/2007 | Schnabel |
| 2008/0034114 | A1 | 2/2008 | Ducey et al. |
| 2008/0085695 | A1 | 4/2008 | Vare et al. |
| 2008/0090599 | A1 | 4/2008 | Patel et al. |
| 2008/0195664 | A1 | 8/2008 | Maharajh et al. |
| 2008/0259844 | A1 | 10/2008 | Richeson et al. |
| 2010/0250665 | A1 * | 9/2010 | Okamoto et al. ............. 709/203 |
| 2012/0131612 | A1 * | 5/2012 | Liu et al. ........................... 725/39 |
| 2012/0246670 | A1 * | 9/2012 | Altchek ........................... 725/14 |
| 2013/0039251 | A1 * | 2/2013 | Wilkinson et al. ............ 370/312 |

OTHER PUBLICATIONS

Richland County GIS; "Automated Vehicle Location for Asset Management"; Columbia, South Carolina; Sep. 2007; all pages.

Advanced Television Systems Committee; "ATSC Candidate Standard: Non-Real-Time Content Delivery"; Washington D.C.; Dec. 2010; all pages.

Catapano, D. et al.; "DTV Data Broadcasting: Opportunities and Experiences"; International Association of Broadcasting Manufacturers; Jul. 2003; all pages.

Gomez-Barquero, D. et al.; "Filecasting for Streaming Content Delivery in IP Datacast over DVB-H Systems"; Broadband Multimedia Systems and Broadcasting, 2008 IEEE International Symposium; Mar. 2008; all pages.

Desourdis, R. Jr. et al.; "Digital Television for Homeland Security"; Technologies for Homeland Security, 2011 IEEE International Conference; Nov. 2011; all pages.

Valcourt, S.A. et al.; "Using Two-Way Datacasting to Deliver Real-Time Public Safety Information"; Technologies for Homeland Security, 2008 IEEE Conference; May 2008; all pages.

"Project 54: Meet Your Car of the Future"; Mission Critical Communications, vol. 23, Issue 10; Oct. 2008; Abstract.

Valcourt, S.A.; et al.; "Information Integration for Public Safety Officers"; Proc. of SPIE, vol. 6943, 6943OM-1; Orlando, FL; Mar. 2008; all pages.

"SkyScraper 3.0"; Triveni Digital; Sep. 2005; all pages.

Leggiere, P.; "Keeping Up with the Crowds"; Homeland Security Today Magazine; Oct. 2011; all pages.

Thomas, G.; "ATSC Datacasting: Opportunities and challenges"; NAB Broadcasting Engineering Conference; Apr. 2000; all pages.

Nandhakumar, N. et al.; "DTV Datacasting Opportunities and Challenges"; Workshop on Video Compression & Delivery, Broadcast Engineering Society; Bangalore, India; Jun. 2002; all pages.

"Local Emergency Services Network Technology Deployed"; TV TechCheck; Apr. 2007; all apges.

Bhat, D., et al.; "An Open Interface to a DTV Data Server"; NAB2001 Broadcast Engineering Conference; Apr. 2001; all pages.

"SkyCraper Interactive"; Triveni Digital; Mar. 2002; all pages.

Nandhakumar, N.; "Field Experience with Datacast Services"; Triveni Digital; Feb. 2002; all pages.

"City of Rochester Fire Department Selects End-to-End Triveni Digital Solution for Public Safety Communications Network in the State of New York"; Triveni Digital; Feb. 2006; all pages.

"KLCS Pilots Data Broadcasting of Educational Materials with Triveni Digital"; Triveni Digital; Apr. 2004; all pages.

"Mississippi Public Broadcasting and Triveni Digital Respond to Havoc Created on Education System by Hurricane Katrina"; Triveni Digital; Nov. 2005; all pages.

"StreamBridge CR30 Digital EAS"; Triveni Digital; Sep. 2005; all pages.

"StreamScope MT-40"; Triveni Digital; Jul. 2007; all pages.

"StreamScope RM-40"; Triveni Digital; Jul. 2007; all pages.

"Skyscraper ESN: Emergency Services Network (ESN) Solution"; Triveni Digital; Mar. 2006; all pages.

* cited by examiner

TECHNIQUES FOR SENDING AND RELAYING INFORMATION OVER BROADCAST AND NON-BROADCAST COMMUNICATIONS MEDIA

CROSS-REFERENCE TO RELATED APPLICATIONS

The present application claims priority to U.S. provisional patent application Ser. No. 61/646,960, filed on May 15, 2012, which is incorporated by reference herein in its entirely.

BACKGROUND OF THE INVENTION

Many approaches exist for targeting information sent over a network, including "push" and "pull" targeting. In push targeting, the sender identifies the recipient(s) of the message based on the address or label inserted into the message. In pull targeting, the receiving device determines which sent messages to deliver.

However, in these approaches, the receiver of the messages is assumed to have access to a communications medium over which the messages are delivered. When a receiver is not within the coverage area of the communications medium, delivery to the receiver is delayed until the receiver moves within the delivery area. When a receiver does not have the hardware and/or software capabilities for receiving messages over the communications medium, the receiver cannot receive the messages. This may be true even when the receiver is within the coverage area of the communications medium and/or has the capabilities for connecting over other types of communications media.

BRIEF SUMMARY OF THE INVENTION

According to one embodiment of the present invention, a method, comprises: (a) receiving, by a first receiver, one or more messages from a server over a broadcast communications medium, each message comprising associated targeter data attributes; (b) selecting, by the first receiver, one or more of the messages from the server for storage in a message store of the first receiver device based on the targeter data attributes associated with each message from the server; (c) receiving, by the first receiver, a message request from a second receiver device over a non-broadcast communications medium; and (d) in response to the message request, sending, by the first receiver, one or more messages in the message store of the first receiver device to the second receiver device over the non-broadcast communications medium.

In one aspect of the present invention, the first receiver comprises a direct receiver, wherein the direct receiver is a receiver that receives data from the server, wherein the receiving (a) and the selecting (b) comprises: (a1) receiving, by the direct receiver, the one or more messages from the server over the broadcast communications medium when the direct receiver is within a coverage area of the broadcast communications medium; and (b1) selecting, by a targeter of the direct receiver, one or more of the messages from the server for storage in the message store of the direct receiver based on the targeter data attributes associated with each message from the server.

In one aspect of the present invention, the second receiver comprises a first indirect receiver, wherein the first indirect receiver is a receiver that receives data via another receiver, wherein the receiving (c) and the sending (d) comprises: (c1) connecting the direct receiver with the first indirect receiver over the non-broadcast communications medium; (c2) receiving, by a relay agent of the direct receiver, the message request from the first indirect receiver for messages in the message store of the direct receiver over the non-broadcast communications medium; and (d1) in response to the message request from the first indirect receiver, sending, by the relay agent of the direct receiver, one or more messages in the message store of the direct receiver to the first indirect receiver over the non-broadcast communications medium.

In one aspect of the present invention, the method further comprises: (e) selecting, by a targeter of the first indirect receiver, one or more of the messages from the direct receiver for storage in a message store of the first indirect receiver based on the target data attributes associated with each message from the direct receiver.

In one aspect of the present invention, the method further comprises: (f) connecting the first indirect receiver to a second indirect receiver over a second non-broadcast communications medium; (g) receiving, by a relay agent of the first indirect receiver, a message request from the second indirect receiver for messages in the message store of the first indirect receiver over the second non-broadcast communications medium; and (h) in response to the message request from the second indirect receiver, sending, by the relay agent of the first indirect receiver, one or more messages in the message store of the first indirect receiver to the second indirect receiver over the second non-broadcast communications medium.

In one aspect of the present invention, the method further comprises: (i) selecting, by a targeter of the second indirect receiver, one or more of the messages from the first indirect receiver for storage in a message store of the second indirect receiver based on the target data attributes associated with each message from the first indirect receiver.

In one aspect of the present invention, the broadcast communications medium carries a digital television signal.

A system and a computer readable medium corresponding to the above-summarized methods are also described and claimed herein.

DETAILED DESCRIPTION OF THE INVENTION

Figure 1:
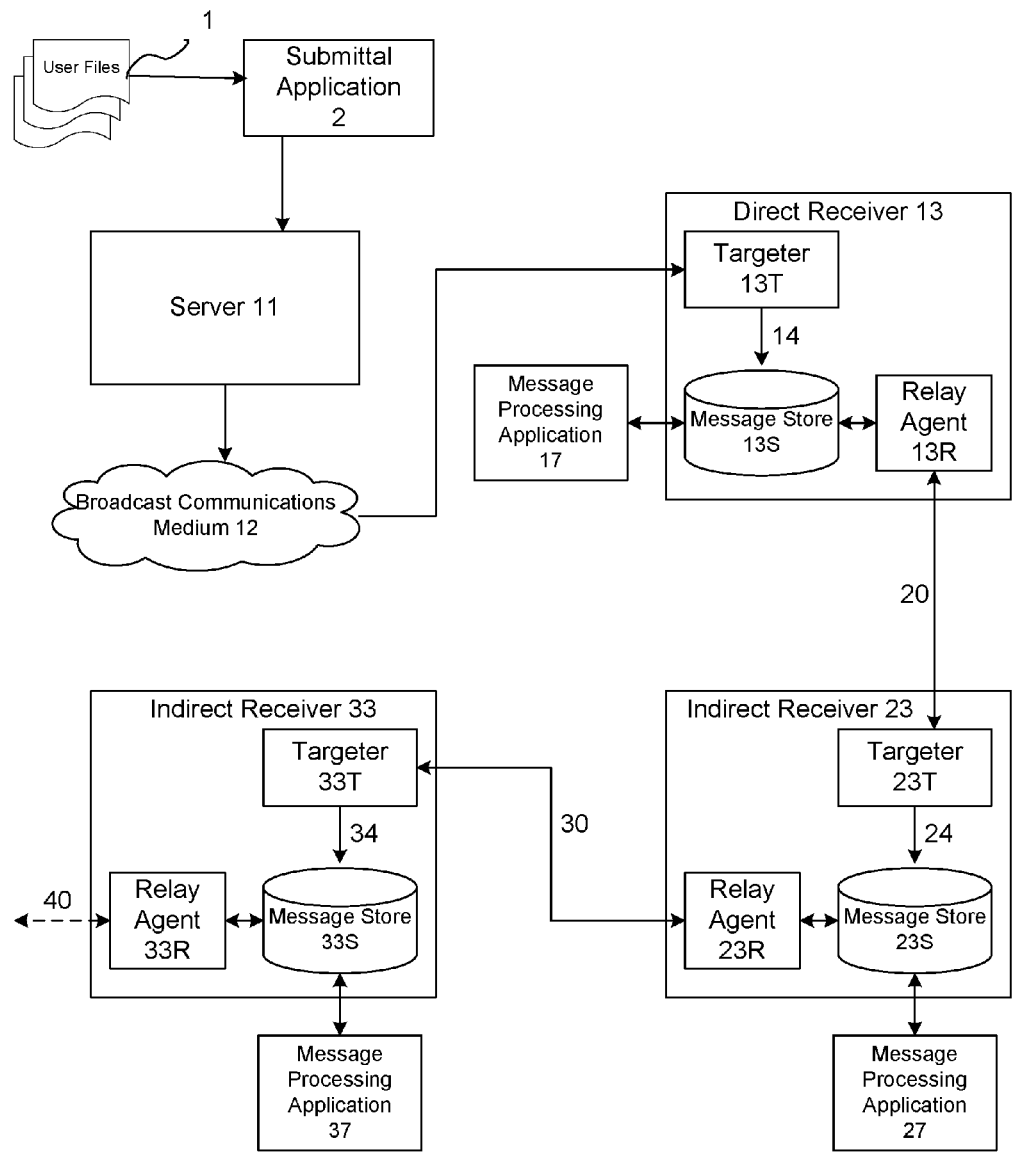
FIG. 1 illustrates an embodiment of a system for sending information over a broadcast and a non-broadcast communications media according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a system for sending information over a broadcast and a non-broadcast communications media according to the present invention. Objects or messages in the form of user files 1 are submitted via a submittal application 2 to a datacasting server 11. The server 11 transmits information over a broadcast communications medium 12 to a direct receiver 13. In the present context, a direct receiver is a receiver that receives data from a sending server. For example, the server 11 may be coupled to an ATSC transmitter broadcasting data using one or more digital TV signals; the broadcast communications medium 12 may be television waves; and the direct receiver 13 may be a laptop computer equipped with a digital TV receiver component and software. For a given broadcast communications medium and server, there is a coverage area where the direct receiver 13 can receive the data broadcast by the server 11.

In further examples, the server 11 may be coupled to a satellite or airborne transmitter, the broadcast communications medium 12 may be microwaves, and the direct receiver 13 may be a mobile or desktop computer equipped with a receiver component to receive signals of the transmitter 11. The SIRIUS® satellite broadcasting system may be used. However, any convenient form of server, broadcast communications medium, and receiver component may be used, and different kinds may be used in combination. The broadcast communications medium may for example be electromagnetic, acoustic, visible light, ground waves, or a network supporting broadcast transmissions, or a combination. The broadcast communications medium may also make use of relays, and there may be more than one sender and there may be more than one receiver component.

The direct receiver 13 includes a targeter component 13T and a message store 13S. The message store 13S stores messages selected or chosen by the targeter component 13T. In some embodiments, a number of targeter data attributes or metadata are associated with each message. The targeter component 13T selects messages to be stored in the message store 13S based on targeter data attributes.

Messages may be in the form of data objects. Kinds of data objects include files, data structures, and combinations.

The message store 13S stores the messages received and selected by the targeter component 13T. When the direct receiver 13 is not in the coverage area, the message store 13S retains messages that the receiver has received. The message store 13S makes its messages accessible to a message processing application 17 and to a relay agent 13R as described below. There may be any number of message processing applications and/or relay agents, and there may be a number of message stores in a distributed, fail-over, or other configuration.

The message store 13S may be implemented using a relational database, data structures in memory accessible to a processor, or other form of storage. In some embodiments, the message processing application 17 and/or relay agent 13R receives a notification when a message has been placed in the message store 13S for the message processing application 17 to process. In some embodiments the message processing application 17 and/or the relay agent 13R may poll or access the message store 13S to determine whether there are messages for the message processing application 17 to process. Other techniques for messages of the message store 13S to be accessible to the relay agent 13R or the message processing application 17 may be employed as well.

A message-processing application 17 is an application that processes one or more messages of the message store 13S. A message processing application 17 accesses or is provided a message in the message store 13S and performs a number of operations based at least in part on information of the message.

In some embodiments the message processing application 17 may obtain a message from the message store 13S by providing a message request to the message store 13S. In response to the message request, the message store 13S may provide a message to the message processing application 17. In some embodiments, the message-processing application 17 interacts with the message store 13S in further ways. For example, the message-processing application 17 may cause the message to be deleted from the message store 13S, may update one or more messages or other data of the message store 13S, or add a further message to the message store 13S.

In some embodiments, a message-processing application 17 may cause a change to one or more components of the system, such as: updating or changing the receiving settings or other data or characteristics of the receiver 13R; displaying information for a user, or receiving input from a user, or interacting with one or more users in another fashion such as by a user interface; transmitting data or exercising control over an attached or embedded device; or transmitting, receiving, or providing data from other components.

A relay agent 13R also can access or be provided a number of messages from the message store 13S. The relay agent 13R provides messages from the message store 13S to an indirect receiver 23. In the present context, an indirect receiver is a receiver that receives messages of a sender via a relay agent of another receiver. The indirect receiver 23 has a targeter component 23T, a message store 23S, and a message processing application 27. An indirect receiver 23 may perform functionalities similar to a direct receiver 13 by receiving messages of a sender 11 via a relay agent from the message store 13S of another receiver such as direct receiver 13. An indirect receiver may also have a relay agent 23R for providing messages from the message store 23S to another indirect receiver, such as indirect receiver 33, over another non-broadcast communications medium 30. The indirect receiver 33 also includes a targeter 33T, a message store 33S, a relay agent 33R, and a message processing application 37. The indirect receiver 33 may perform the functionalities similar to the indirect receiver 23 by receiving messages via a relay agent 23R from the message store 23S of another indirect receiver such as indirect receiver 23.

In some embodiments, the relay agent 13R is provided message requests from an indirect receiver 23, and in response, provides messages in message store 13S to the indirect receiver 23 via a non-broadcast communications medium 20. For example, the non-broadcast communications medium 20 may be a link over a wired or wireless network, a serial communications link, one or more data pipes, or a logical link, or a combination. In many embodiments, the non-broadcast communications medium 20 is logically distinct from the broadcast communications medium 12.

Any component may be implemented to a degree on the same hardware or separate hardware as other components. For example, a message-processing application may be implemented on the same hardware as the receiver, or separately, such as in a separate computing device capable of communicating with the receiver and/or message store via a network connection or other means.

There may be multiple instances of components, including replications of components in whole or in part, for example a relay agent may provide messages to a number of indirect receivers, or a message store may be implemented in a distributed or redundant form, or a receiver may receive message from more than one sender, which further may send messages over more than one or different kinds of broadcast media.

Components may be implemented together, or as a number of components. For example, a receiver may be both a direct receiver and an indirect receiver. A first direct receiver may function as an indirect receiver to a second direct receiver when the first receiver is not in the coverage area of the sender. The first and second receiver may receive and provide messages in a store-and-forward fashion. As a further example, a first and a second receiver may be connected logically via their respective relay agents as a direct and an indirect receiver to each other, and may manage their respective message stores so that messages are not repeatedly stored in a looping fashion, and to achieve failure survivability for an event such as different direct receivers are affected differently by failures in the broadcast medium, a sender, or a receiver being out of the coverage area of the sender.

The relay agent 13R may also accept other data or information from the indirect receiver 23, for example to delete, update, or add messages from the message store 13S in response to an action of a message processing application 27 of the indirect receiver 23. In some embodiments, the indirect receiver 23 provides the other information to maintain integrity between copies of a same message of both message store 23S and message store 13S, such as to delete a message from the message store 13S when it is deleted from message store 23S.

Figure 2:
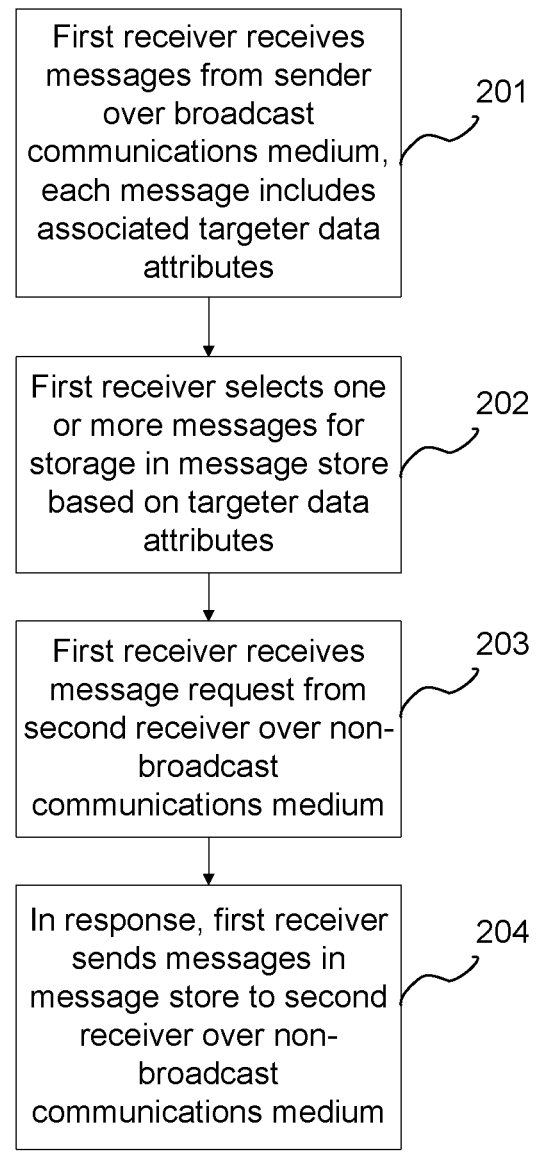
FIG. 2 is a flowchart illustrating an embodiment of a method for sending information over a broadcast communications medium according to the present invention.

FIG. 2 is a flowchart illustrating an embodiment of a method for sending information over a broadcast communications medium according to the present invention. A first receiver, such as direct receiver 13, receives messages from a sender over a broadcast communications medium 12, where each message includes associated targeter data attributes (201). The first receiver selects one or more of the messages for storage in its message store based on the targeter data attributes associated with each message (202). At some point in time, the first receiver receives a message request from a second receiver, such as indirect receiver 23, over a non-broadcast communications medium (203). In response to the message request, the first receiver provides the messages in its message store to the second receiver over the non-broadcast communications medium (204).

Figure 3:
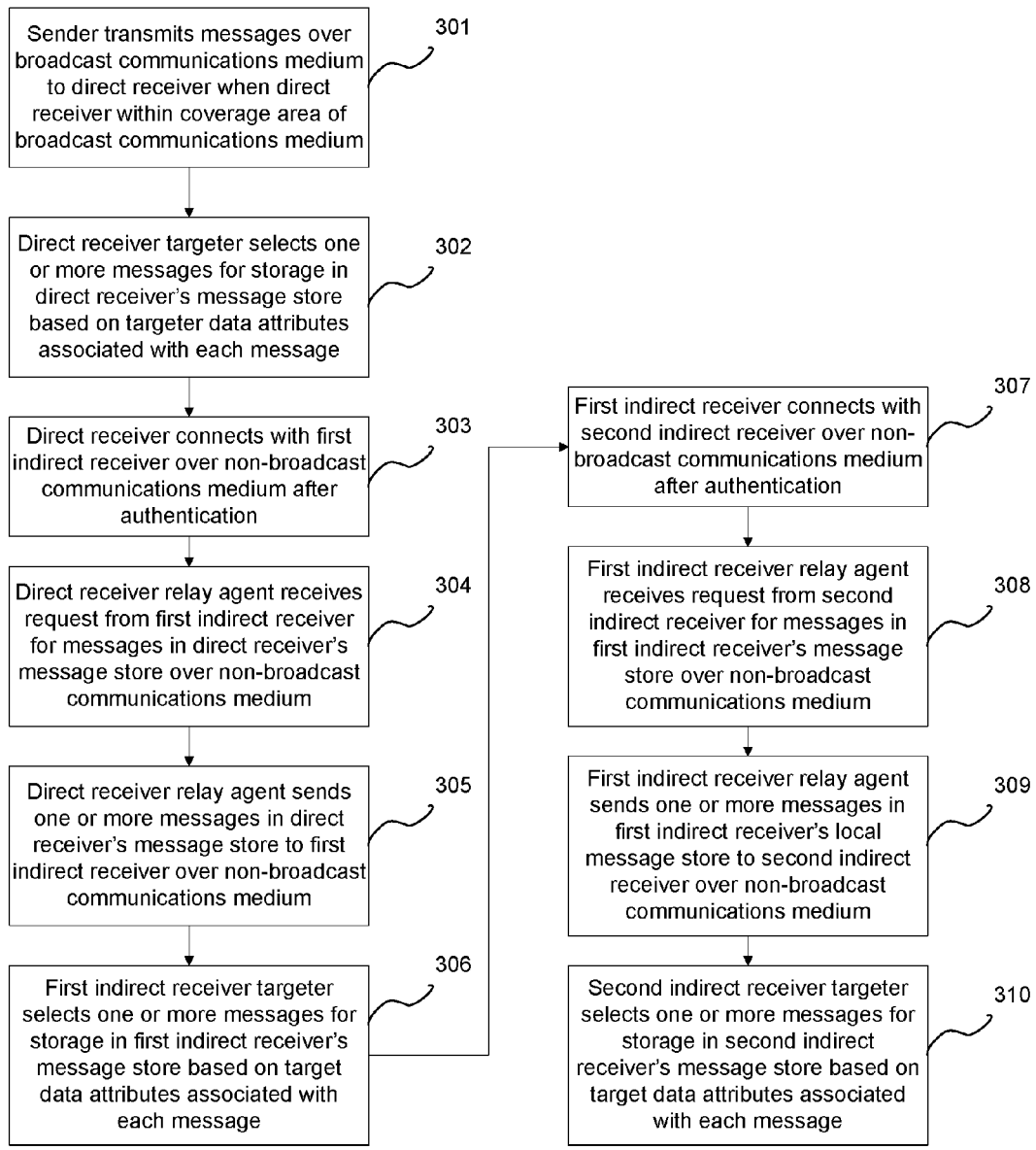
FIG. 3 is a flowchart illustrating in more detail the embodiment of the method for sending information over a broadcast communications medium according to the present invention.

FIG. 3 is a flowchart illustrating in more detail the embodiment of the method for sending information over a broadcast communications medium according to the present invention.

Referring to both FIG. 1 and FIG. 3, the sender 11 transmits messages over the broadcast communication medium 12 to the direct receiver 13 when the direct receiver 13 is within the coverage area of the broadcast communications medium 12 (301). The direct receiver's targeter 13T selects one or more messages to be stored on the direct receiver's message store 13S based on the targeter data attributes associated with each message from the sender (302). At some point in time, the direct receiver 13 connects with the first indirect receiver 23 over a non-broadcast communications medium 20, after the first indirect receiver 23 is authenticated (303). The direct receiver's relay agent 13R then receives over the non-broadcast communications medium 20 a request from the first indirect receiver 23 for messages in the direct receiver's message store 13S (304). In response, the direct receiver's relay agent 13R sends one or more messages in the direct receiver's message store 13S to the first indirect receiver 23 over the non-broadcast communications medium 20 (305). In one embodiment, the relay agent 13R sends all messages in its message store 13S to the indirect receiver 23. In another embodiment, the relay agent 13R sends less than all of the messages in its message store 13S to the indirect receiver 23. For example, the relay agent 13R may send only those messages that the indirect receiver 23 is determined to be allowed access or determined to be able to understand, based on the target data attributes associated with the messages.

The relay of messages to the indirect receiver 23 may occur at any point in time after the relay agent 13R receives the message request. Further, the relay of message to the indirect receiver 23 may occur over more than one connection. For example, the indirect receiver 23 may move out of the direct receiver's 13 coverage area after the relay begins. When the indirect receiver 23 moves again inside the direct receiver's 13 coverage area, the relay may resume. For another example, the messages may be repeatedly relayed at differing temporal rates, depending on the criticality of the information in the message. Other variations in relaying of the messages may be possible without departing from the spirit and scope of the present invention.

Upon receipt of the messages from the relay agent 13R, the first indirect receiver's targeter 23T selects one or more of these received messages for storage in the first indirect receiver's messages store 23S based on the target data attributes associated with each message (306).

Optionally and at some point in time, the first indirect receiver 23 connects with a second indirect receiver 33 over a non-broadcast communications medium 30, after the second indirect receiver 33 is authenticated (307). The non-broadcast communications media 20 and 30 can be the same type or different types of communications media. The first indirect receiver's relay agent 23R then receives a request from the second indirect receiver 33 for messages in the first indirect receiver's message store 23S over the non-broadcast communication medium 30 (308). In response, the first indirect receiver's relay agent 23R sends one or more messages in the first indirect receiver's message store 23S to the second indirect receiver 33 over the non-broadcast communications medium 30 (309). In one embodiment, the relay agent 23R sends all messages in its message store 23S to the second indirect receiver 33. In another embodiment, the relay agent 23R sends less than all of the messages in its message store 23S to the second indirect receiver 23. For example, the relay agent 23R may send only those messages that the second indirect receiver 23 is determined to be allowed access or determined to be able to understand.

Upon receipt of the messages from the relay agent 23R, the second indirect receiver's targeter 33T selects one or more of these received messages for storage in the second indirect receiver's messages store 33S based on the target data attributes associated with each message (310).

In this manner, one or more indirect receivers are able to receive messages indirectly from the sender via another receiver when the receiver will not or cannot receive messages directly from the sender.

For example, a first fire vehicle has a device that is capable of connecting with the sender 11 over the broadcast communications medium 12 and is also capable of functioning as a WiFi hotspot. Assume that the first fire vehicle's device receives a message for a fire emergency directly from the sender 11, including the location and an image of the scene, over the broadcast communications medium 12. The device stores the message in its message store. The first fire vehicle device is thus functioning as a direct receiver. The first fire vehicle then proceeds to the location of the fire emergency. Assume that a second fire vehicle arrives at the location to assist. However, the second fire vehicle device is not capable of receiving messages directly from the sender 11 but is capable of connecting via WiFi. Upon arriving at the location, the second fire vehicle device establishes a WiFi connection with the first fire vehicle device over the first fire vehicle device's WiFi hotspot. The second fire vehicle device is thus functioning as an indirect receiver. The second fire vehicle device then sends a request for messages stored on the message store of the first fire vehicle device. The first fire vehicle device responds by sending the messages in its message store to the second fire vehicle device over the WiFi connection. In this manner, information about the fire emergency may be relayed to the second fire vehicle device even though the second fire vehicle device cannot receive the information directly from the sender 11. Assume that a police vehicle also arrives at the location to assist. The police vehicle device may connect with the second fire vehicle device as a second indirect receiver. The second fire vehicle device may then relay the information about the fire emergency to the police vehicle device.

Figure 4:
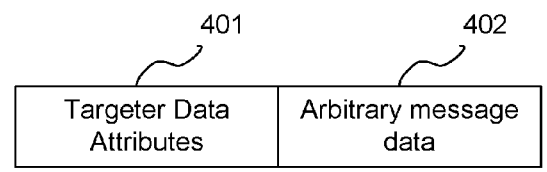
FIG. 4 illustrates an embodiment of a typical message sent by the sender over a broadcast communications medium and a non-broadcast communications medium according to the present invention.

FIG. 4 illustrates an embodiment of a typical message sent by the sender 11 over the broadcast communications medium 12, by the direct receiver 13 over the non-broadcast communications medium 20, or by the indirect receiver 23 over the non-broadcast communications medium 30, according to the present invention. As illustrated, each message includes targeter data attributes 401 and arbitrary message data 402.

Figure 5:
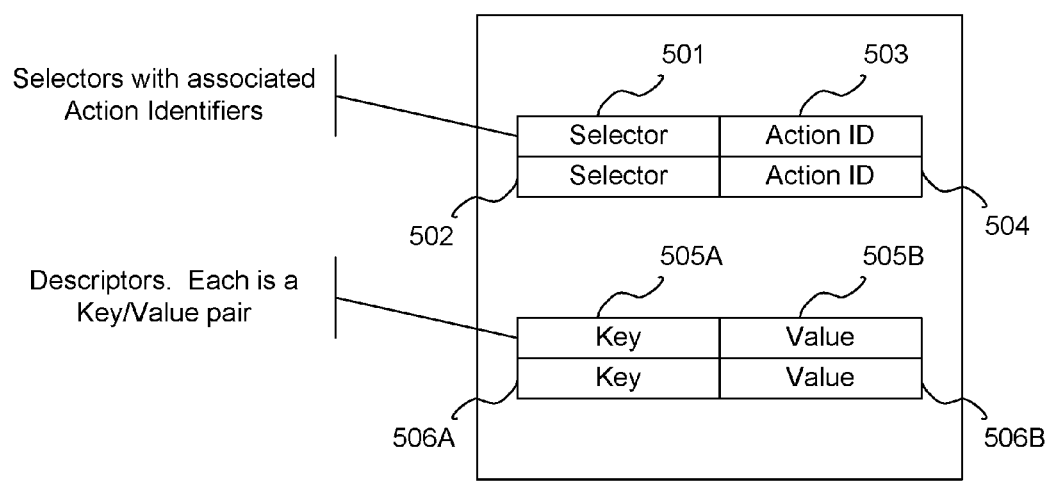
FIG. 5 illustrates an embodiment of the contents of the targeter data attributes 401 according to the present invention.

FIG. 5 illustrates an embodiment of the contents of the targeter data attributes 401 according to the present invention. There are selectors, such as 501 and 502 associated with action identifiers, such as 503 and 504, respectively. Each descriptor comprises a key value pair such as 505A-505B and 506A-506B. When transmitted, target data attributes are represented as a potentially short XML (Extensible Markup language) document following a widely used DTD or XDS (Document Type Definition, XML Schema Definition: declarations that define a document type for the XML language). If XML is not feasible in a given deployment for some reason, any serializable representation may be used. In a device, they may be stored in any convenient representation. A selector is a Boolean expression over the keys and the descriptors in the message and the descriptor stored in the receiving device. The syntactic representation of selectors may be one of many representations with identical semantics that will be apparent to one of ordinary skill in the art. Descriptors are shown in FIG. 5 as key-value pairs. In some embodiments, the keys are stored explicitly in the descriptors. In another embodiment, the keys are not stored explicitly but are implicitly represented based on the position of the descriptors in the data structure. In still another embodiment, some keys are implicitly represented and some are stored explicitly.

Some key-values pairs used in a targeter's selector expression may not be part of the message, instead they may be defined by the receiver itself. For instance a selector may contain an expression that uses the Latitude and Longitude of the receiver, which would be a descriptor provided by the receiver during selector evaluation.

Figure 6:
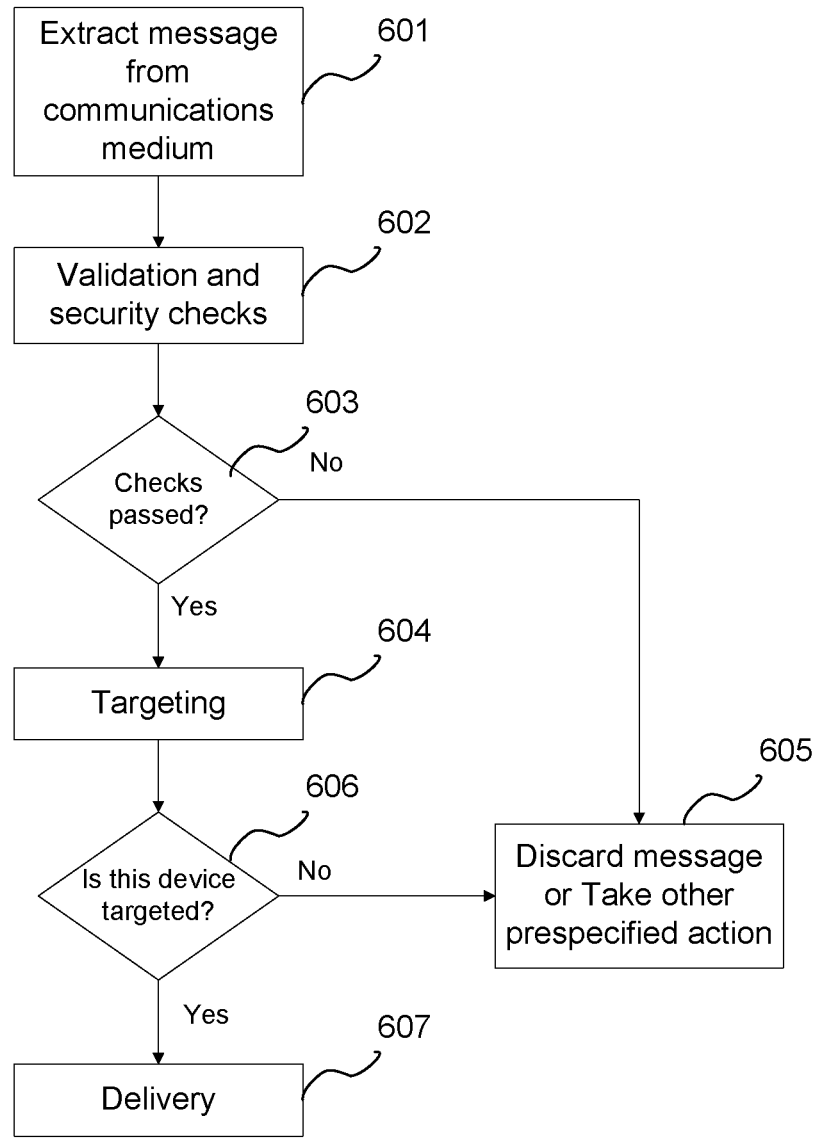
FIG. 6 is a flowchart illustrating an embodiment of the behavior of a receiving device process according to the present invention.

FIG. 6 is a flowchart illustrating an embodiment of the behavior of a receiving device process according to the present invention. The device first extracts the message from the communications medium (601) and performs validation and security checks (602). If the checks are passed (603), the device proceeds with the targeting (604). If not, the device discards the message or takes other pre-specified action (605). In the targeting, the device evaluates each selector in the message and each selector stored in the device. If any selector evaluates to true (606), then the device is targeted, and it proceeds to the delivery (607) in which all actions in the action list are carried out. If the device is not targeted, it proceeds to discard the message or take other pre-specified action (605). The targeting process is further described in U.S. patent application Ser. No. 13/019,627, filed on Feb. 2, 2011, titled "Flexibly Targeting Information Sent over a Broadcast Communications Medium", which is incorporated by reference herein in its entirety. The process illustrated in FIG. 6 may be performed by the direct receiver's targeter 13T to select the message(s) from the sender 11 for storage in its message store 13S (302, FIG. 3). The targeting process may also be similarly performed by the first indirect receiver's targeter 23T to select the message(s) from the direct receiver's relay agent 13R to store in its message store 23S (306, FIG. 3). The targeting process may still also be similarly performed by the second indirect receiver's targeter 33T to select the message(s) from the first indirect receiver's relay agent 23R for storage in its message store 33S (310, FIG. 3).

Figure 7:
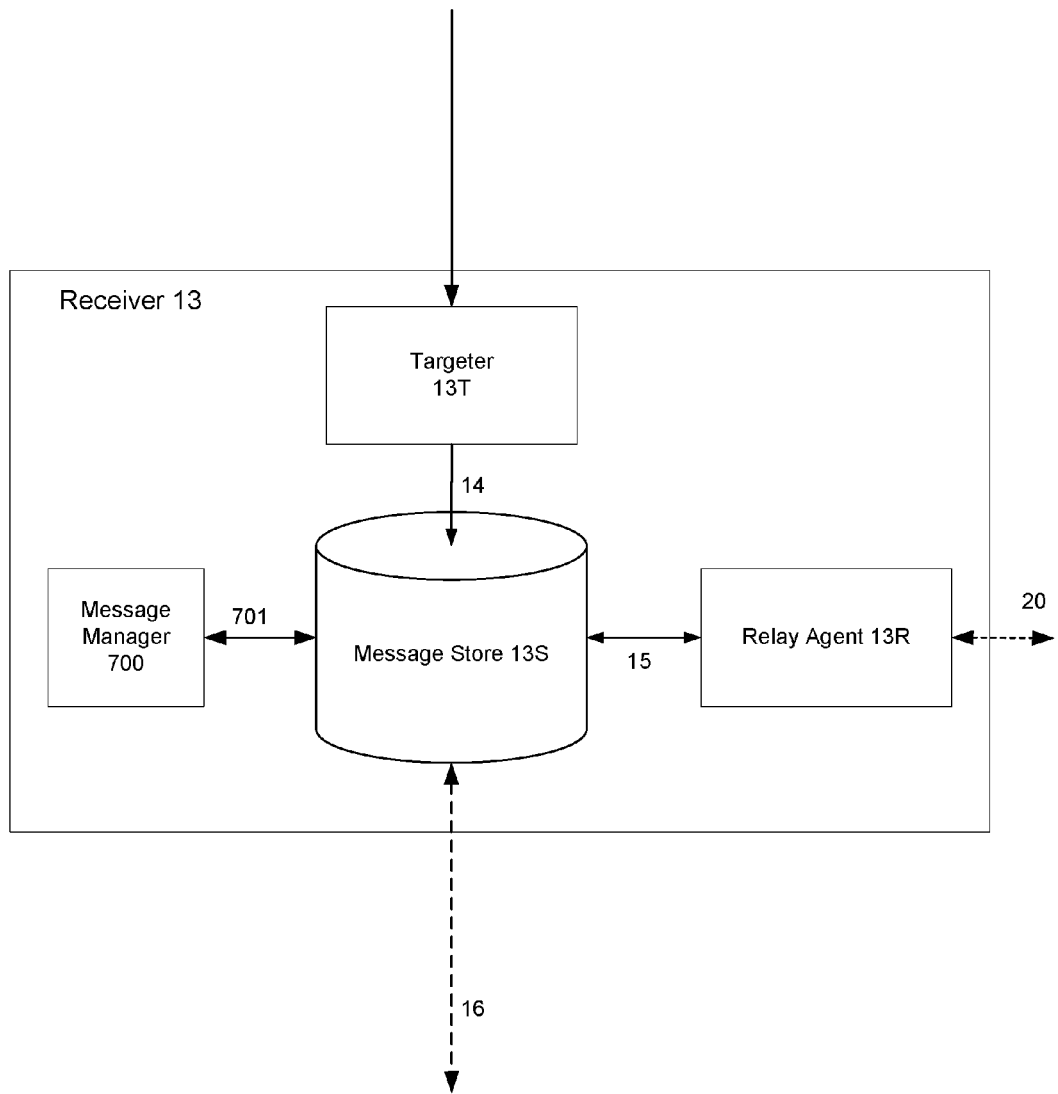
FIG. 7 illustrates an embodiment of a receiver including a message manager according to the present invention.

FIG. 7 illustrates an embodiment of a receiver including a message manager according to the present invention. The receiver 13 may be either a direct or an indirect receiver. The message manager 700 accesses or obtains messages in the message store 13S, and may also modify messages stored in the message store 13S, as indicated by the bi-bidirectional arrow 701.

Figure 8:
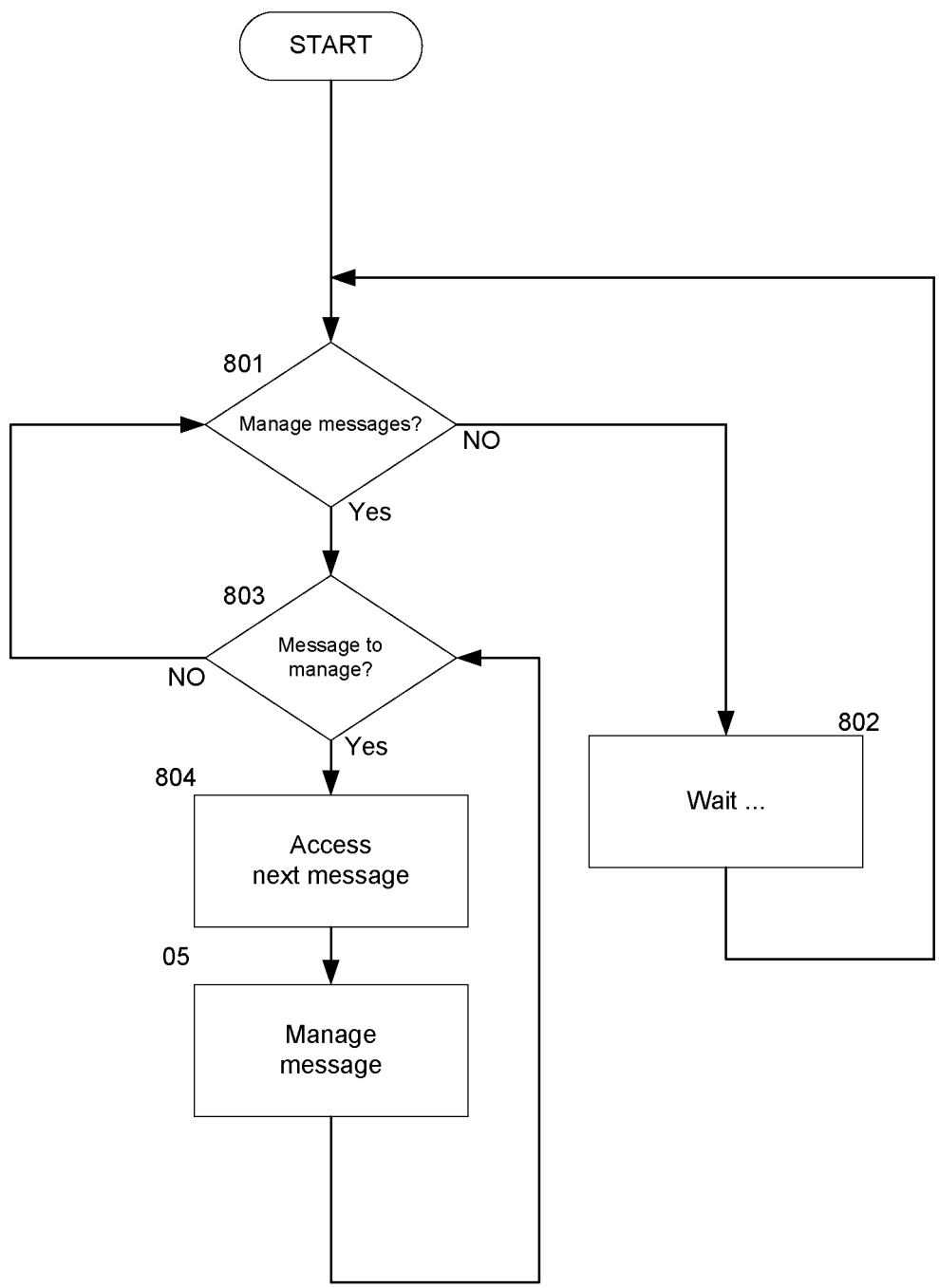
FIG. 8 is a flowchart illustrating the message manager determining whether to manage messages at the current time, according to an embodiment of the present invention.

FIG. 8 is a flowchart illustrating the message manager determining whether to manage messages at the current time, according to an embodiment of the present invention. The message manager determines whether it is appropriate to manage messages at the current time (801). The determination may be made by a fixed or variable time polling loop, by checking whether any messages stored in the message store 13S. If it is not appropriate to manage messages at the current time, the message manager 700 waits for a period of time (802), before returning to determine again whether it is appropriate to manage messages (801). In one alternative embodiment, the message manager waits until some condition occurs before making the determination again, for example, an event indication that a new message has been added or a message has been modified by a message processing application.

If it is appropriate to manage messages, the message manager 700 proceeds to determine whether there are any messages in the message store 13S to be managed (803). There may be no messages to be managed if the message store 13S contains no messages. There may also be no message to be managed if none of the message metadata or message data indicates any managing actions to be performed, according to a set of rules. The rules may be dynamic. If there are no messages to be managed, the message manager 700 returns to determine when it is again appropriate to manage messages (801). If there are a number of messages to be managed, the message manager proceeds to access or obtain a message from the message store 13S (804). Next, the message manager 700 manages the message (805), as discussion further below with reference to FIG. 9, and sets an indication that the message has been managed. The process repeats until all messages to be managed are processed (803-805).

Figure 9:
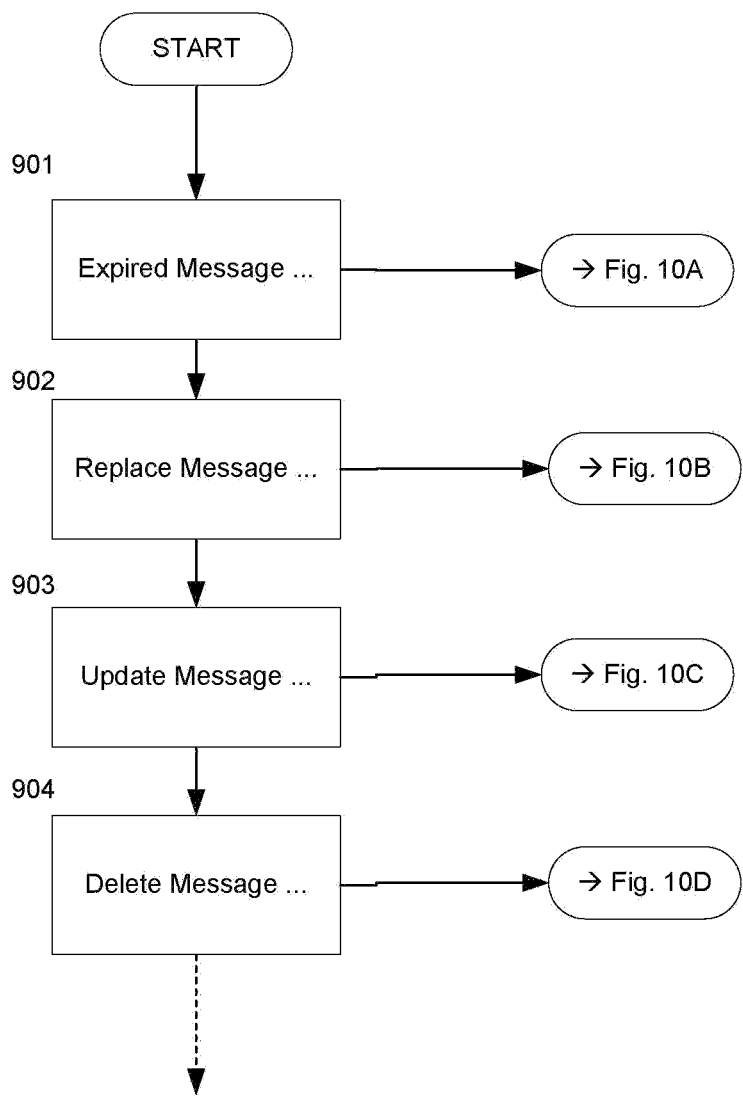
FIG. 9 illustrates in further detail the management of messages by the message manager according to an embodiment of the present invention.

FIG. 9 illustrates in further detail the management of messages by the message manager according to an embodiment of the present invention. The message manager 700 determines from metadata or data of the message whether the message may be expired (901), and if so manages the message in the manner described below with reference to FIG. 10A. If the message manager 700 determines that the message should be replaced by another message (902), the message manager 700 performs the replacement of the message in the manner described below with reference to FIG. 10B. If the message manager 700 determines that the message should be updated by replacing, augmenting, or removing some data of the message with other data (703), the message manager performs the replacement, augmentation, or removal, in the manner described below with reference to FIG. 10C. If the message manager 700 determines that the message should be deleted (904), the message manager 700 performs the deletion in the manner described below with reference to FIG. 10D.

Figure 10A:
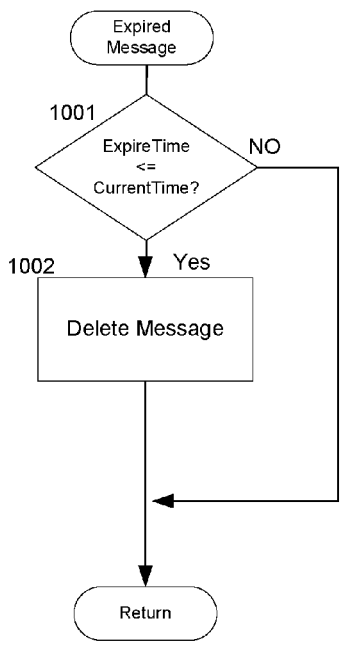
FIG. 10A is a flowchart illustrating the management of an expired message by the message manager, according to an embodiment of the present invention.

FIG. 10A is a flowchart illustrating the management of an expired message by the message manager, according to an embodiment of the present invention. Metadata or data of the message contains an expiration time for the message, such as in the form of a key-value pair stored with the message or in association with the message. In some implementations this expiration value is included with the message sent by the sender 11, or may be determined from a timestamp value of when the message is received by the receiver and from a set of rules; or by other means or a combination. The message manager 700 determines whether the message is expired by comparing the expiration time value of the message with the current time (1001). If the current time is not later than the expiration time, the message manager 700 does not delete the message. If the current time is later than the expiration time, the message manager 700 deletes the message from the message store 13S (1002).

Figure 10B:
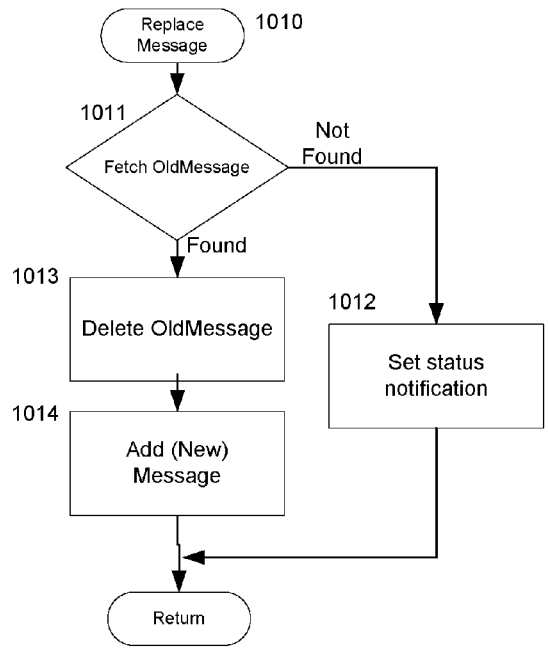
FIG. 10B is a flowchart illustrating the replacement of the message by the message manager, according to an embodiment of the present invention.

FIG. 10B is a flowchart illustrating the replacement of the message by the message manager, according to an embodiment of the present invention. Here, the message manager 700 determines that a present (new) message indicates that an existing (old) message should be replaced by the present message (1010). In a number of implementations, data or metadata of the present message includes an identifier of the existing message, where the identifier may be simple or may be complex. The message manager 700 proceeds to fetch or access the existing message in the message store 13S, by providing the message identifier to the message store 13S (1011). If the existing message is not present in the message store 13S, for example if the existing message has been deleted by an operation of a message processing application or other operation, in a number of implementations the message manager 700 sets a status notification that the existing message was not present (1012). Alternately, the message manager 700 sets the status notification that the existing message was not present and also adds the new message (1014). If the existing message is found, the message manager 700 proceeds to delete the existing message from the message store 13S (1013). The message manager 700 then adds or retains the current message to the message store 13S as a replacement for the deleted or old message (1014).

Figure 10C:
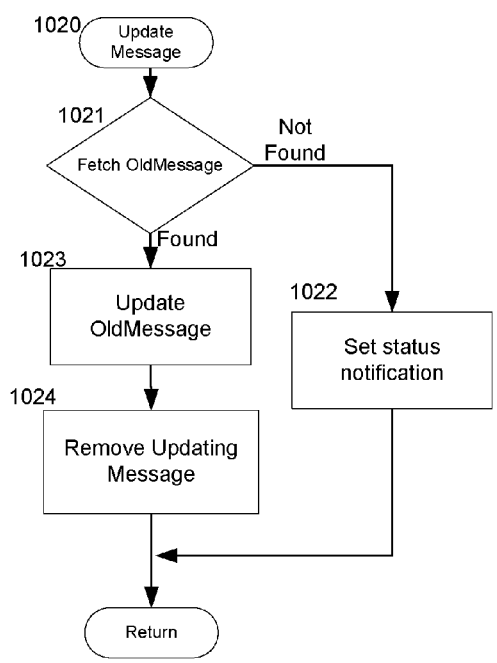
FIG. 10C is a flowchart illustrating the update of the message by the message manager, according to an embodiment of the present invention.

FIG. 10C is a flowchart illustrating the update of the message by the message manager, according to an embodiment of the present invention. Here, the message manager 700 determines that an existing (old) message is to be updated with information of a present (new) message (1020). In a number of implementations, metadata or data of the present message includes an identifier of the existing message, and information to update, replace, or augment at least a portion of the information of the existing message. The message manager 700 proceeds to fetch or access the existing message in the message store 13S (1021), by providing the message identifier to the message store 13S. If the existing message is not present in the message store 13S, in a number of implementations the message manager 700 sets a status notification that the existing message was not present (1022). If the existing message is found, the message manager 700 proceeds to update the existing message using information of the present message (1023). The present message—referred to also as an updating message—is then removed from the message store (1024).

Figure 10D:
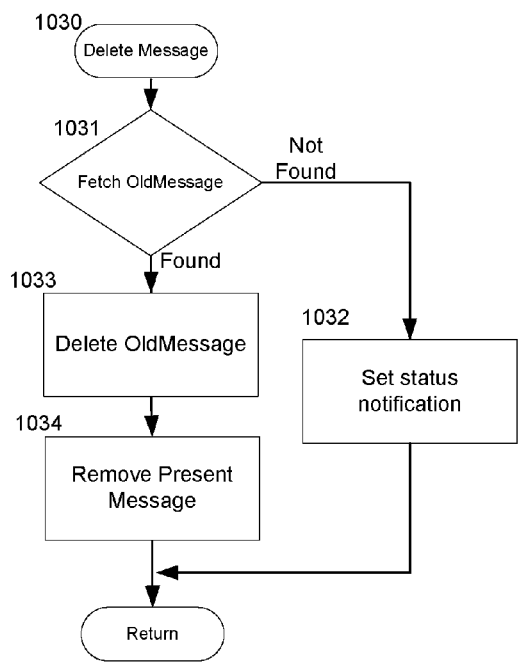
FIG. 10D is a flowchart illustrating the deletion of the message by the message manager, according to an embodiment of the present invention.

FIG. 10D is a flowchart illustrating the deletion of the message by the message manager, according to an embodiment of the present invention. In some applications, the deletion of a message may be referred to as recalling a message. As discussed above, the present message includes an identifier of the message to be deleted from the message store 13S. When the message manager determines that the message is to be deleted (1030), the message manager 700 proceeds to fetch or access the existing message in the message store 13S, by providing the message identifier to the message store 13S (1031). If the existing message is not present in the message store 13S, in a number of implementations the message manager 700 sets a status notification that the existing message was not present (1032). If the existing message is found, the message manager 700 proceeds to delete the existing message from the message store (1033). The present message is also removed from the message store (1034).

FIGS. 10A-10D illustrate examples of actions for managing messages by the message manager 700. Other actions for managing messages may be taken by the message manager 700, or by the receiver itself, without departing from the spirit and scope of the present invention.

Figure 11:
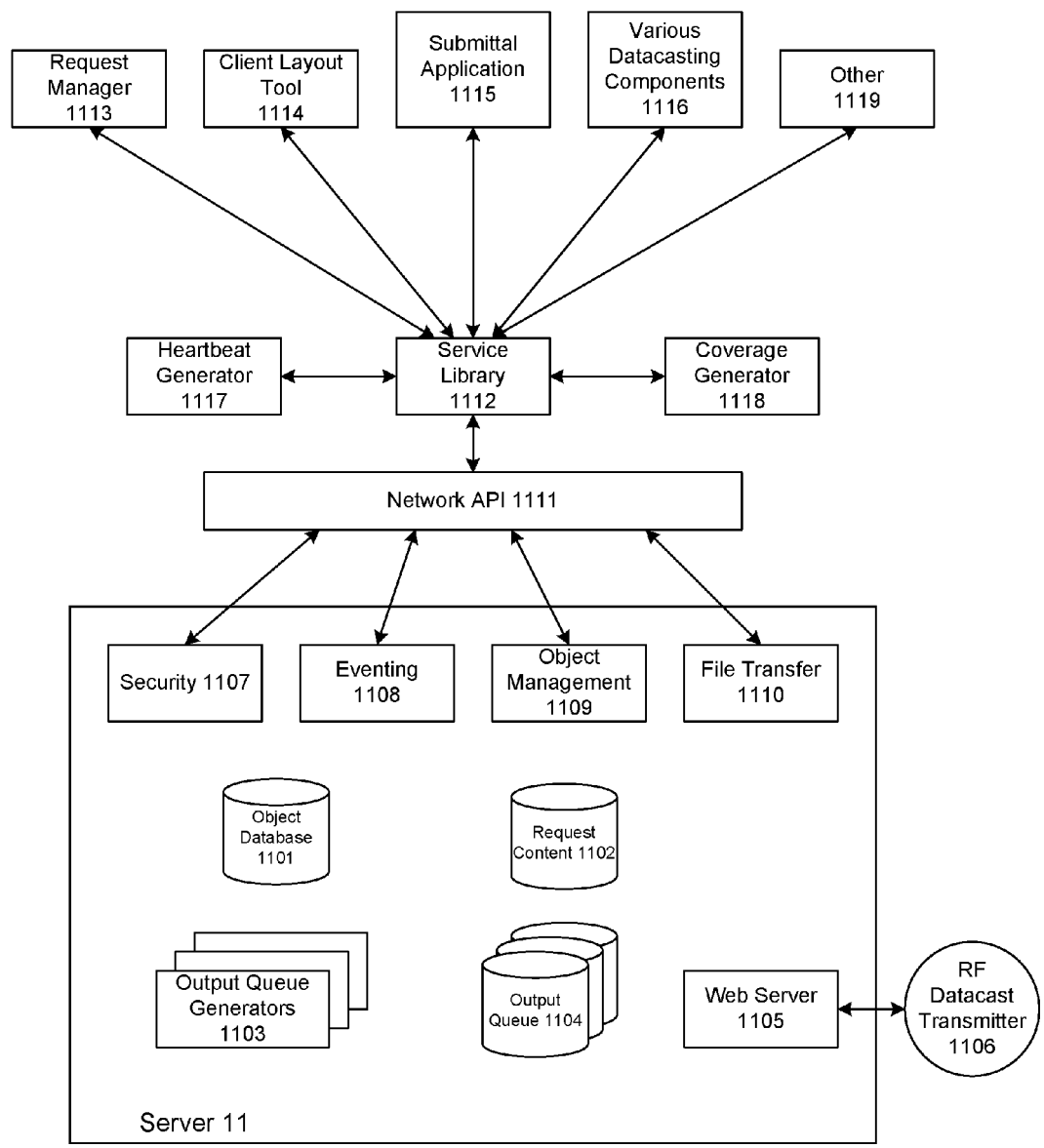
FIG. 11 illustrates an exemplary architectural overview of the sending server 11 according to an embodiment of the present invention.

FIG. 11 illustrates an exemplary architectural overview of the sending server 11 according to an embodiment of the present invention. As shown, the server 11 contains an object database 1101 for storing objects, a request content storage 1102 for storing requests to be processed, one or more output queue generators 1103 for preparing objects to be datacast, an output queue 1104 for holding objects or messages to be datacast, and a web server 1105 component that provides the output objects or messages via a subnet network to a transmitter 1106 for transmitting the datacast information.

Also shown are security 1107, eventing 1108, object management 1109, and file transfer 1110 components of the server 11. These components may interact bi-directionally with components external to the server 11 by means a network API 1111 with a service library 1112 interface. As shown, exemplary external components that can interact with the server 11 include a request manager 1113, a client layout tool 1114 for laying objects to be datacast, a submittal application 1115 for submitting messages, a number of datacasting components 1116, and optionally other components 1119 providing other functionalities. Further, a heartbeat generator 1117 is used to monitor whether the server 11 is operating and a coverage generator 1118 to generate messages used to monitor or determine the effective coverage area of the transmitter 1106.

Figure 12:
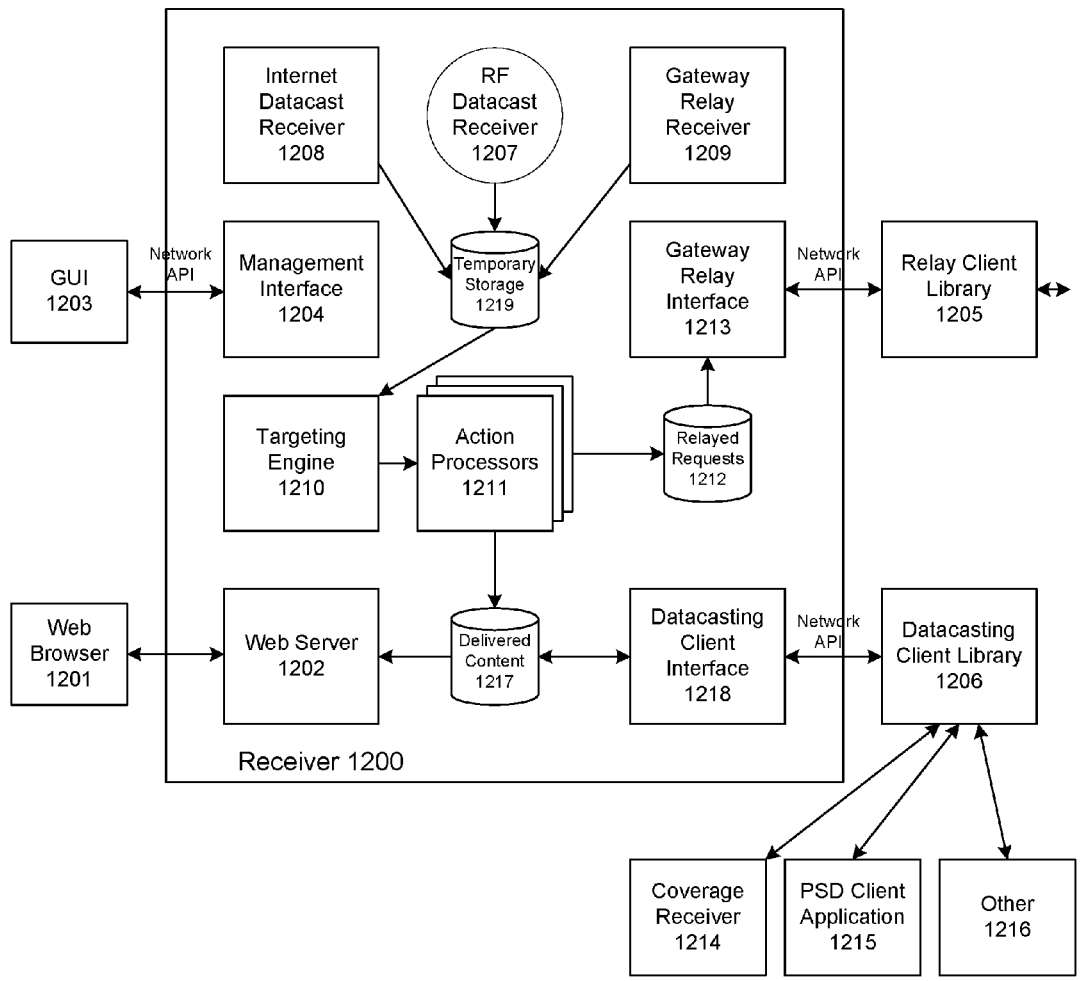
FIG. 12 illustrates an exemplary architectural overview of a receiver, also referred to as a gateway, according to an embodiment of the present invention.

FIG. 12 illustrates an exemplary architectural overview of a receiver, also referred to as a gateway, according to an embodiment of the present invention. Shown are external interfaces including a web browser interface 1201 for viewing messages or delivered content 1217 (made available by an internal web server component 1202), a graphical user interface 1203 (GUI) for managing the receiver 1200 (via an internal management interface 1204), a datacasting client library 1206 of software for communicating with an indirect receiver via a datacasting client interface 1218, and a datacasting client library 1206. The datacasting client library 1206 includes a coverage receiver 1214, a client application 1215, and optionally other components 1216 for providing other functionalities. Also shown are internal components of a receiver 1200, including an RF datacast receiver 1207 (for a direct receiver), an Internet datacast receiver 1208 for receiving messages datacast via a representative wired network, a gateway relay receiver 1209 (for an indirect receiver), and a temporary storage 1219. Also shown are a targeting engine 1210 for implementing targeter components, action processors 1211 for acting in response to messages, and a store for relayed requests 1212 to be relayed via the gateway relay interface 1213.

In one embodiment, the indirect delivery of messages described above may be provided in conjunction with a request channel or back channel to create a closed-loop communication system or service. To send information over wide areas, at low costs, and with great speed, a system that sends data using the unidirectional broadcast of information may be constructed and used. These systems can be called datacasting systems and may include a centralized broadcast infrastructure transmitting information to many receiving devices. Information is scheduled or submitted for transfer at a central facility, which transmits the data via radio signal. This signal is received by one or many devices simultaneously, each of which processes the received signal for its use.

In one embodiment, the implementation of the datacasting is to transmit data over the digital television (DTV) standard as defined by the ATSC A153 M/H standard. In such a system, a DTV transmitter and multiple DTV receivers may be used to construct a data delivery service. Such a system allows all receiving elements within the footprint or coverage area for the broadcast signal to receive the same information simultaneously.

In certain circumstances, such a system may include the ability to flexibly target the receipt of information using metadata to manage the receipt and processing of the transmitted information. One example is described in U.S. patent application Ser. No. 13/019,627, previously referenced above. In this system, different receivers receive the same broadcast data stream but process the data uniquely according to ancillary information, thereby receiving a potentially unique stream of data for that device.

The following description discloses the combination of a data broadcasting (or datacasting) service with one or more request channels or back-channels to create a unique closed-loop communications system. This service may be provided by one of the other components 1119 illustrated in FIG. 11. This system allows one or more users to send requests for information to a listening system or service that interprets those requests. The listening service acts upon the request by acquiring and/or processing the appropriate information. The listening service then uses a datacasting service to submit or send a response to the originating request. This response may be received exclusively by the requesting receiver and/or other datacasting receivers in the broadcast area.

An advantage of this combination is that it allows the datacasting service to deliver information to its end users "on demand" instead of either only previously-scheduled information or information deemed "likely" to be useful to its receivers.

Figure 13:
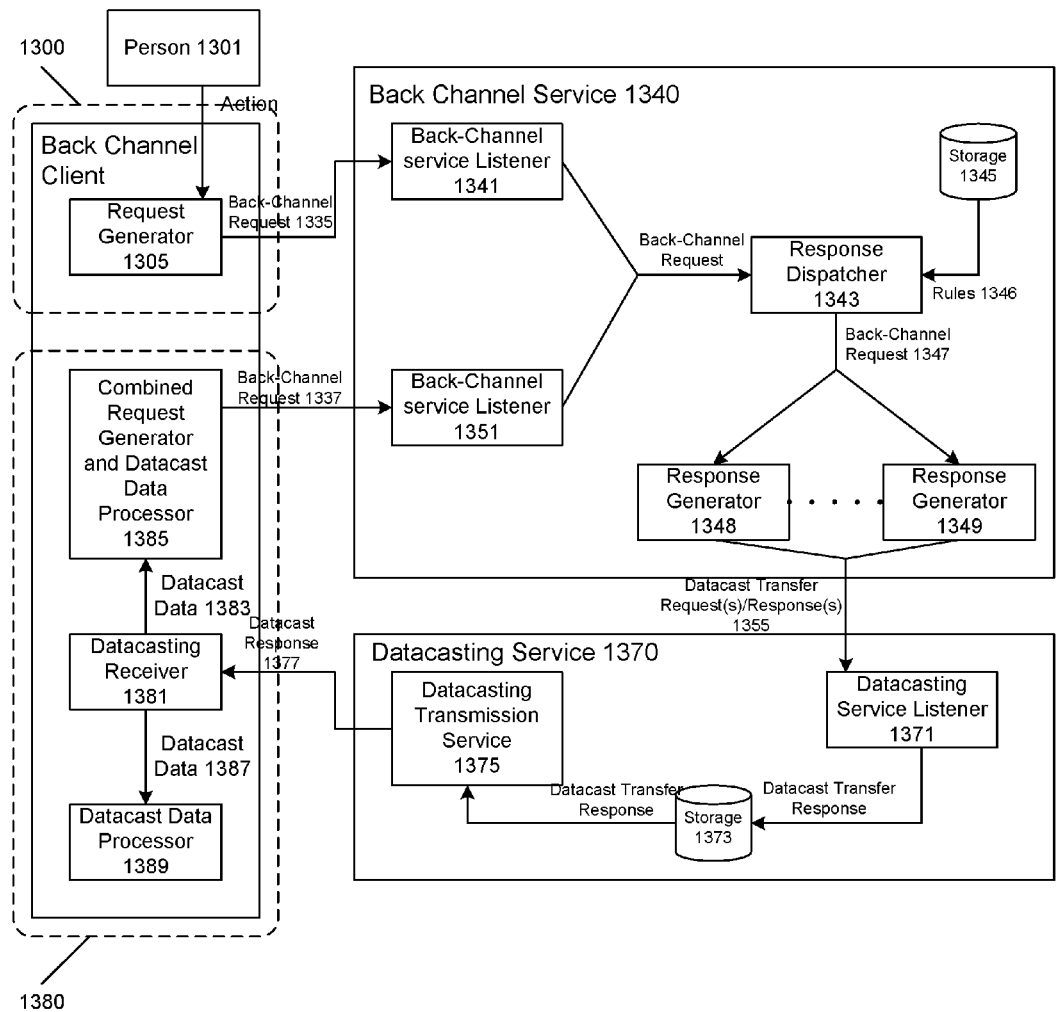
FIG. 13 illustrates an exemplary system implementing the datacasting service with one or more request channels according to an embodiment of the present invention.

FIG. 13 illustrates an exemplary system implementing the datacasting service with one or more request channels according to an embodiment of the present invention. The system includes: the back-channel requestor or back-channel client 1300, a back-channel request (1335 and 1337), the back-channel service 1340, a datacast response 1377, the datacasting service or datacasting transmission service 1370, and the datacasting receive client 1380.

The back-channel requestor 1300 and the datacasting receive client 1380 may be implemented in a combined fashion in a single unit of hardware, or separately, as indicated by the dashed outlines of requestor client 1300 and receive client 1380.

In response to an input action from a person 1301, a request generator component 1305 of a back-channel requester 1300 generates a back-channel request 1335 and transmits it to the back-channel service 1340. The back-channel request 1335 is generated from user action inputs and/or other data local to the back channel requester 1300. The generated requests are transmitted using a back-channel radio transmitter of the back channel client 1300 with the intent of being received and acted upon by a back-channel receiver of the back channel service 1340. This transmission may or may not be acknowledged by the receiver itself.

The back-channel request (BC request) is a message that describes the information desired by the end-user 1301. It is transmitted from the back-channel requester 1300 to the back-channel service 1340 over a back-channel link. The message may be formatted according to any one of several previously-defined schemes that include but are not limited to: natural language text, an internet URL request string, an XML document using a defined schema, an SQL query string, or a Boolean text search expression. The request may also include forward-error correction (FEC) to assist the back-channel service listener 1341 in receiving a message that was corrupted during transmission. BC requests may include a unique identifier so that a datacast response sent by the datacasting service 1370 in response to the request may reference the request, and the datacasting receiver 1381 may associate the back-channel request and the corresponding datacast response. BC requests may also include information identifying the back-channel requester 1300 that generated the request. As BC requests are processed by the back channel service 1340 they may be amended with information identifying the back-channel service 1340 that received the request, and the response generator 1348-1349 that generated the response to the request.

The back-channel service 1340 receives and processes BC requests sent to it. A back-channel service listener 1341 listens for back-channel messages and receives the BC requests contained within the messages. A response dispatcher 1343 then dispatches or routes each request 1347 to an appropriate response generator 1348-1349. Which response generator 1348-1349 is appropriate for a given request is determined based on the application of rules 1346 stored in an accessible storage 1345 to data or metadata of the request, or further factors such as system loading or performance. Each response generator 1348-1349 executes software to process its BC requests according to that request's content and metadata. A response generator, such as 1348, reacts to the contents of a BC request by generating and submitting a number of datacast responses to the datacasting transmission service 1375. There may be multiple response generators 1348-1349. Response generators 1348-1349 may be associated with specific back-channels, requestors, or specific message/request types, either statically or dynamically based on information of the requests.

The datacast response may be any object that can be transmitted by the datacasting service 1370 and is meaningful to the datacasting receive client 1380. The content of a typical datacast response may include one or more images, documents, web pages, executable program instructions, database records, or other messages and any metadata about those messages. The format of the response may be any format coordinated between the response generator(s) that processed the BC request and the datacasting receiver. The metadata included in a response should but is not required to include the BC request, its unique identifier, or information identifying the back-channel requestor that generated the BC request, back-channel service that received the BC request, the request processor(s) that processed the BC request, or any other metadata that is deemed to be useful to other system components, especially the datacasting transmission service or datacasting receiver.

The datacasting service 1370 provides a way for submitting datacast files or other data objects to a wired or wireless network broadcast system. It includes a device, host, or server for receiving and storing the data objects and any attendant metadata, as well as the transmission equipment used to encode the data into a broadcast signal and transmit that signal. The host or server contains a receiving component called datacasting service listener 1371 which communicates with a computer network and allows response generators to transmit to it any generated datacast response items. This listener 1371 stores the datacast responses in storage 1373 and schedules them for transmission according to their content, the related metadata and the business rules/logic established by the service provider. The transmission equipment encodes the given data response information into an emitted signal, thereby delivering the data responses to all eligible data receivers in its coverage area.

The datacasting receiver 1381 listens for datacast response messages over its communication medium interface and processes those responses. To do so, it must first demodulate and rebuild the encoded message and its metadata. Then, it must process the embedded datacast response with an appropriate software processor 1389. This software processor will be selected based upon the content of the response, its related metadata, and information local to the datacast receiver itself. Typical processing would include:

for locally generated requests, the correlation of the response to the request that generated it;

visual display of the response, the nature of the request that generated it, and possibly the identity of the request generators; and storage for long-term use of this information.

The datacast receiver 1381 may discard messages that are corrupted, that it does not understand, for which it is not an eligible recipient, or for which it has no appropriate software processor.

In overview, operation comprises the following steps.

The end user or agent 1301 interacts with the request generator 1305, through a graphical user interface or a mechanical input to specify the information of interest.

The request generator 1305 creates a back-channel request 1335 that describes this information in a format that is understandable by the back-channel service listener 1341 for one of its configured back-channel communication mediums.

The request generator 1305 sends the BC request 1335 to the back-channel service 1340 using the corresponding encoding scheme and transmission device.

The back-channel service listener 1341 receives and decodes the transmission containing the request 1335.

The back-channel service response dispatcher 1343 determines the appropriate response generator(s) 1348-1349 for this request, based upon its contents, the associated metadata and the business rules stored locally in the dispatcher. It delivers the BC request message to those response generator(s) for processing.

Each response generator 1348-1349 generates zero or more datacast responses 1355 to a given BC request. This may be done by retrieving the end-user's desired information from a data store, performing a desired computation, or a combination of both. Normally a single response generator will operate on a single BC request and generate a single datacast response, but this may vary based upon configuration options and the data involved.

Any response generator(s) that have created datacast responses will submit them to the datacast transmission service 1375 via the datacasting service listener 1371 for transmission by the service. Part of this operation may include the submission of any credentials required to establish the identity of the generator.

The datacast service listener 1371 receives and stores the datacast response in the storage 1373 and schedules it for transmission by the service.

The datacast transmission service 1375 encodes and broadcasts the datacast requests 1377. This broadcast may occur one time or multiple times in order to increase the likelihood of its receipt by the datacast receivers. The transmission almost always includes forward error-correction (FEC) to increase the integrity of the received transmissions.

If a datacast receiver 1381 is situated where it can receive the broadcast signal, it will receive that signal and decode the datacast response 1377 contained within it. For receivers that are part of a flexibly targeted datacasting system, the receiver may reject a response if that response is not 'targeted' for this receiver.

If the response is to be processed, then the datacast receiver 1381 informs all local software processors that a new datacast response has arrived and delivers it to them for processing.

A software processor 1389 may update the local user interface, direct the control of an attached device, store or update data contained in a local store or any combination of the above as part of its operation. The most common operation is to display the contents of the response—which if all components have operated correctly should be the information that was originally requested via the back-channel requestor 1305.

A receiver may contain a combined request generator and datacast data processor 1385. This processor 1385 both receives datacast information and generates requests for datacast information over the back-channel. Such a processor could autonomously request and process information on behalf of the receiver and its operator based on the receiver's status, location, movement, etc.

In practice most receivers with back-channel links will implement some form of this combined generator 1385 to confirm the integrity of the closed-loop delivery system formed by the datacasting/back-channel system.

Applications created for such this type of closed-loop system may send automatic receipt acknowledgements over the back-channel. The response generator 1348-1349 can respond to this message by removing the queued data from the datacasting service (i.e. "all clients have received, so delete message").

There are further aspects of the techniques in various embodiments, including the following:

The back-channel requester 1300 and a response display system may be integrated into a single device or software component.

A request may be made via a voice channel, in which the request is made orally and sent to a radio dispatcher, and the dispatcher acts as the response generator.

A request may be of the form of a simple HTTP request message and the response may be a packaged version of a web page and its dependent items (scripts, images, included files, etc.)

A user interface such as a web-browser is used to create and submit requests, and the same user interface used to display the response when it is received.

A record of HTTP requests and web content responses may be maintained and remain available for use when there is no connectivity either for datacasts and/or back-channel requests.

The back-channel communications link may support bidirectional communications, and used primarily as a back-channel for transmitting requests, and a separate datacasting communications medium used to return responses. Examples of bidirectional links include without limitation: short-wave radios, cellular telephones, WiFi (IEEE 802.11) devices, or other ISM-band radios.

The back-channel communications link may be optical or laser-based.

Metadata of the datacast response may be used to route the transmission of the response in the datacasting service 1370.

Metadata of the datacast response 1377 may be used to direct the processing of the response by the datacast receiver 1381.

The back-channel service 1340 may be implemented in combination with or together with the datacasting service 1370.

The back-channel service 1340 may be implemented separate from the datacasting service 1370. The back-channel service and the datacasting transmission server may be connected by a computer network, and the datacast response 1355 is submitted via this network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method, comprising:
   (a) receiving, by a direct receiver, one or more messages from a server over a broadcast communications medium when the direct receiver is within a coverage area of the broadcast communications medium, each message comprising associated targeter data attributes;
   (b) selecting, by a targeter of the direct receiver, one or more of the messages from the server for storage in a message store of the direct receiver based on the targeter data attributes associated with each message from the server;
   (c) connecting the direct receiver with a first indirect receiver over a non-broadcast communications medium;

(d) receiving, by a relay agent of the direct receiver, a message request from the first indirect receiver for messages in the message store of the direct receiver over the non-broadcast communications medium;

(e) in response to the message request from the first indirect receiver, sending, by the relay agent of the direct receiver, one or more messages in the message store of the direct receiver to the first indirect receiver over the non-broadcast communications medium;

(f) selecting, by a targeter of the first indirect receiver, one or more of the messages from the direct receiver for storage in a message store of the first indirect receiver based on the target data attributes associated with each message from the direct receiver;

(g) connecting the first indirect receiver to a second indirect receiver over a second non-broadcast communications medium;

(h) receiving, by a relay agent of the first indirect receiver, a message request from the second indirect receiver for messages in the message store of the first indirect receiver over the second non-broadcast communications medium; and (i) in response to the message request from the second indirect receiver, sending, by the relay agent of the first indirect receiver, one or more messages in the message store of the first indirect receiver to the second indirect receiver over the second non-broadcast communications medium.

2. The method of claim 1, further comprising:

(i) selecting, by a targeter of the second indirect receiver, one or more of the messages from the first indirect receiver for storage in a message store of the second indirect receiver based on the target data attributes associated with each message from the first indirect receiver.

3. The method of claim 1, wherein the broadcast communications medium carries a digital television signal.

4. A computer program product comprising:

a non-transitory computer readable medium comprising computer readable program code embodied therein, the computer readable program code configured to:

(a) receive, by a direct receiver, the one or more messages from a server over a broadcast communications medium when the direct receiver is within a coverage area of the broadcast communications medium, each message comprising associated targeter data attributes;

(b) select, by a targeter of the direct receiver, one or more of the messages from the server for storage in a message store of the direct receiver based on the targeter data attributes associated with each message from the server;

(c) connect the direct receiver with a first indirect receiver over a non-broadcast communications medium;

(d) receive, by a relay agent of the direct receiver, a message request from the first indirect receiver for messages in the message store of the direct receiver over the non-broadcast communications medium;

(e) in response to the message request from the first indirect receiver, send, by the relay agent of the direct receiver, one or more messages in the message store of the direct receiver to the first indirect receiver over the non-broadcast communications medium;

(f) select, by a targeter of the first indirect receiver, one or more of the messages from the direct receiver for storage in a message store of the first indirect receiver based on the target data attributes associated with each message from the direct receiver;

(g) connect the first indirect receiver to a second indirect receiver over a second non-broadcast communications medium;

(h) receive, by a relay agent of the first indirect receiver, a message request from the second indirect receiver for messages in the message store of the first indirect receiver over the second non-broadcast communications medium; and (i) in response to the message request from the second indirect receiver, send, by the relay agent of the first indirect receiver, one or more messages in the message store of the first indirect receiver to the second indirect receiver over the second non-broadcast communications medium.

5. The computer program product of claim 4, wherein the computer readable program code is further configured to:

(i) select, by a targeter of the second indirect receiver, one or more of the messages from the first indirect receiver for storage in a message store of the second indirect receiver based on the target data attributes associated with each message from the first indirect receiver.

6. A system, comprising:

a direct receiver to receive one or more messages from a server over a broadcast communications medium when the direct receiver is within a coverage area of the broadcast communications medium, each message comprising associated targeter data attributes, wherein the direct receiver comprises a targeter to select one or more of the messages from the server for storage in a message store of the direct receiver based on the targeter data attributes associated with each message from the server;

a first indirect receiver, wherein the direct receiver connects with the first indirect receiver over the non-broadcast communications medium, wherein the direct receiver comprises a relay agent to receive a message request from the first indirect receiver for messages in the message store of the direct receiver over the non-broadcast communications medium, wherein in response to the message request from the first indirect receiver, the relay agent of the direct receiver sends one or more messages in the message store of the direct receiver to the first indirect receiver over the non-broadcast communications medium, wherein the first indirect receiver comprises a targeter to select one or more of the messages from the direct receiver for storage in a message store of the first indirect receiver based on the target data attributes associated with each message from the direct receiver; and a second indirect receiver, wherein the first indirect receiver is connected to the second indirect receiver over a second non-broadcast communications medium, wherein the first indirect receiver comprises a relay agent to receive a message request from the second indirect receiver for messages in the message store of the first indirect receiver over the second non-broadcast communications medium, and wherein in response to the message request from the second indirect receiver, the relay agent of the first indirect receiver sends one or more messages in the message store of the first indirect receiver to the second indirect receiver over the second non-broadcast communications medium.

7. The system of claim 6, wherein the second indirect receiver comprises a targeter to select one or more of the messages from the first indirect receiver for storage in a message store of the second indirect receiver based on the target data attributes associated with each message from the first indirect receiver.

* * * * *